(12) United States Patent
Walworth

(10) Patent No.: US 7,759,457 B2
(45) Date of Patent: *Jul. 20, 2010

(54) POLYMERISATION PROCESS

(75) Inventor: Brent Walworth, Sint-Niklaas (BE)

(73) Assignee: Ineos Manufacturing Belgium NV, Antwerp (BE)

( * ) Notice: Subject to any disclaimer, the term of this patent is extended or adjusted under 35 U.S.C. 154(b) by 275 days.

This patent is subject to a terminal disclaimer.

(21) Appl. No.: 11/659,188

(22) PCT Filed: Aug. 4, 2005

(86) PCT No.: PCT/EP2005/008493

§ 371 (c)(1), (2), (4) Date: Oct. 1, 2007

(87) PCT Pub. No.: WO2006/015807

PCT Pub. Date: Feb. 16, 2006

(65) Prior Publication Data

US 2008/0214745 A1    Sep. 4, 2008

(30) Foreign Application Priority Data

Aug. 10, 2004    (EP) ................... 04254809

(51) Int. Cl.
  *C08F 6/04*   (2006.01)
  *C08F 2/38*   (2006.01)
  *B01D 3/14*   (2006.01)

(52) U.S. Cl. .......... 528/501; 526/65; 526/909; 203/99

(58) Field of Classification Search ........ 528/501; 526/65; 203/99
See application file for complete search history.

(56) References Cited

U.S. PATENT DOCUMENTS

| | | | | |
|---|---|---|---|---|
| 3,658,780 | A | * | 4/1972 | Scoggin ............ 526/70 |
| 4,589,957 | A | * | 5/1986 | Sherk et al. ........ 203/75 |
| 6,045,661 | A | | 4/2000 | Kreischer et al. |
| 2001/0018499 | A1 | | 8/2001 | Marissal et al. |
| 2003/0191251 | A1 | | 10/2003 | McGrath |

FOREIGN PATENT DOCUMENTS

| | | |
|---|---|---|
| EP | 0 887 359 A1 | 12/1998 |
| EP | 0 891 990 A2 | 1/1999 |
| EP | 0 891 990 A3 | 11/1999 |
| WO | WO 03/074167 A1 | 9/2003 |
| WO | WO 2004/007566 A1 | 1/2004 |

* cited by examiner

*Primary Examiner*—Fred M Teskin
(74) *Attorney, Agent, or Firm*—Nixon & Vanderhye

(57) ABSTRACT

A process for the polymerisation of olefins is disclosed wherein at least part of a stream, preferably a catalytically active stream, withdrawn from a polymerisation reactor is passed through a fractionator so as to remove hydrogen and active fines.

20 Claims, 4 Drawing Sheets

POLYMERISATION PROCESS

This application is the U.S. National Phase of International Application PCT/EP2005/008493, filed 4 Aug. 2005, which designated the U.S. PCT/EP2005/008493 claims priority to European Application No. 04254809.9 filed 10 Aug. 2004. The entire content of these applications are incorporated herein by reference.

The present invention relates to a process for the treatment of a reactive fluid stream, and more particularly to a process for treat a stream of gas and/or liquid containing active polymer withdrawn from a polymerisation reactor so as to remove reagents and/or impurities therefrom. Options available to treat reactive fluid streams can be constrained by the potential for fouling, blockages etc caused by solids polymerized or carried in the fluid stream. The present invention aims to provide an improved process for treating diluent streams in the production of polyolefins. Such processes are useful where it is required to recycle or feed to a reactor a fluid stream having a lower level of reagent and/or impurities than the level when the stream was withdrawn from the same or a different reactor.

BACKGROUND OF THE INVENTION

An example is in multimodal polymerisation reactions, where the polymers are typically manufactured in reactors connected in series with reaction conditions being differentiated in each reactor. In order to have maximum control of final product properties, it is preferred to have full and independent control of the molecular weight and the density of the polymer produced in each reactor; molecular weight is typically controlled using hydrogen. Consequently it is usually necessary to remove hydrogen from the product stream of a first reactor operating at higher hydrogen concentration than a second reactor in series with the first. The polymer from an upstream reactor to be fed to a downstream reactor in series is typically withdrawn with diluents (gaseous and/or liquid), catalysts and reagents such as monomer(s), comonomer(s), molecular weight control agents such as hydrogen, and cocatalysts. Various technical solutions are known to remove these undesired diluents and/or reagents, including hydrogen, either fully or partially from the polymer prior to its entry into the downstream reactor(s). Such techniques typically include pressure reduction to vaporize undesired components.

In EP 603935A a process is described in which a bimodal polyethylene is produced in series reactors with a low molecular weight homopolymer component being formed in the first reactor and a high molecular weight copolymer component being incorporated in the second reactor, with hydrogen being used to control the molecular weight. There is no discussion of how to remove residual hydrogen between the reactors. In EP 192427A and EP 897934A a significant pressure reduction between the two reactors is employed to remove at least a portion of the hydrogen present. This process is acceptable when the diluent remains substantially in the liquid phase under the pressure reduction conditions required to achieve the desired removal of hydrogen: however if a more volatile diluent is employed, or if a greater degree of hydrogen separation is required, then a more effective method is desirable. Slurry processes employing light (i.e. relatively volatile) solvents exhibit certain advantages over heavier solvent systems. For example, polyolefin oligomers tend to be less soluble, and the solvent is readily and substantially completely removed from the polymer product. However, hydrogen gas must be virtually completely removed between prior and subsequent stages, otherwise process control of the subsequent stage is difficult and high molecular weight may be impossible to attain. Light solvents tend to flash away with the hydrogen. If too much solvent flashes off, solids in the slurry take-off increase to such a high level that the slurry may no longer be pumpable. If solvent flash-off is reduced, hydrogen separation is poor. A further difficulty is that polymer entrained in the flash gas is still catalytically active and may polymerize further, causing problems with fouling of any apparatus employed for hydrogen removal or other separation. Thus it is necessary either to remove or to deactivate the residual polymer. Hence it can be seen that for this type of polymerisation reaction there is a need for an improved process for removing hydrogen between stages.

In US 2003/0191251 two flash vessels are used for the separation of hydrogen from a light diluent between polymerisation reactors. Each vessel has only one equilibrium stage. Significant diluent make-up is required after the first flash step due to a high diluent loss.

In U.S. Pat. No. 3,658,780 a polypropylene slurry withdrawn from a polymerisation reactor is treated with catalyst removal agents and the catalyst then washed out, thereby rendering the stream catalytically inactive, prior to fractionation of the stream to remove hydrogen.

In U.S. Pat. No. 6,045,661 a stream withdrawn from a reactor polymerising ethylene and hexene in isobutane is passed through flash, vessels, and entrained polymer particles removed in a cyclone. At least a portion of the vapour is then compressed before being passed to a fractionator to separate the components. In this process it is stated that removal of entrained solids ensures that the fractionated material is not catalytically active.

BRIEF DESCRIPTION OF THE INVENTION

The present invention aims to provide an improved process for treating catalytically active streams of polyolefins, particularly polyethylene.

Accordingly, in a first aspect the present invention provides a process for the polymerisation of olefins wherein at least part of a catalytically active stream withdrawn from a polymerisation reactor is fractionated. Preferably the process is a continuous polymerisation process.

By "catalytically active" is meant that the stream is capable of undergoing further polymerisation under the conditions present during fractionation. Typically a catalytically active stream contains at least 0.005 particle vol % solid polymer. In such a case the polymer contains the active catalyst. Such solid polymer usually has a particle size such that at least 50% of the polymer has a particle size of at least 10 μm. In one embodiment the polymer concentration consists of fine particles having a mean diameter of less than 100 microns, preferably less than 50 microns. In another embodiment of the invention the concentration of polymer fed into the fractionation stage is at least 30 vol %, and may be higher than 40 vol %.

In an alternative aspect, the invention provides a process for the polymerisation of olefins wherein at least part of a stream withdrawn from a, polymerisation reactor is fractionated. References to a "catalytically active" stream hereinbelow are also intended to cover any stream in this aspect of the invention.

In this specification fractionation means separation in a vessel (i) having more than one equilibrium stage (ii) in which liquid and gas come at least partially into contact in each equilibrium stage, and (iii) within which the fluid stream is vapourised more than once, preferably more than twice. "Fractionator" means a vessel or column in which fractionation takes place.

Reference to an equilibrium stage shall mean a real contacting stage as opposed to a theoretical equilibrium stage.

The fractionation of the catalytically active stream is preferably carried out in a fractionator at a pressure lower than that in the preceding polymerisation reactor(s) and such that the principal fluid in the stream is condensable without recompression, by heat exchange with a cooling medium in the temperature range of about 15-60° C. Most preferably the fractionation is carried out at a pressure and temperature such that at least 50 wt %, preferably at least 75 wt % of the catalytically active fluid stream (absent solid component) which is fed to the fractionator is in the vapour phase.

In this specification, "diluent" means a hydrocarbon component added to the polymerisation reactor to assist removal of heat and/or to suspension of the solid polymer in the reactor. In the case of slurry reactors the diluent is in the liquid or supercritical state in the reactor. The principal diluent is the non-solid component of the fluid stream having the greatest mol % within the reactor, and is preferably inert (i.e. does not polymerize) under reaction conditions.

The treatment of a catalytically active stream of polymer which may also contain monomer(s) would be expected to cause unacceptable fouling and/or equipment downtime to a continuous polymerisation process, particularly to the internals of, and/or the heat exchange equipment associated with, a fractionation column. It has however been found that the process of the invention may be operated without undue fouling or downtime and that the installation of stand-by treatment facilities can be avoided. An advantage of separating undesired light components using fractionation at medium to high pressure with more than one equilibrium stage, rather than a lower pressure single flash drum, is that less recompression of the polymer stream and/or recovered light materials is required, and a more efficient separation operation is also possible. Particularly when separating undesired light components from desired light diluents, the loss of diluent from the separation process is significantly reduced.

The process of the invention includes within its scope the treatment of catalytically active polymer streams withdrawn from more than one reactor. In a preferred embodiment of the invention a fractionator is able simultaneously to treat diluent streams from a combination of reactors (in series or parallel) and return diluent to those reactors that is essentially free of light and/or heavy components, for example streams that are free of hydrogen, or free of comonomer, or free of the principal monomer, or free of all monomers. Having the ability to withdraw treated diluent from any equilibrium stage within the fractionator gives significant flexibility to optimise the quantity and purity of each recycle stream in an economic manner.

This invention is particularly suited to polymerisation of olefins in slurry or suspension reactors. In this case olefin(s) are continuously added to a hydrocarbon diluent (which may be principally inert or principally monomer and be principally a liquid or a supercritical fluid) containing catalyst. The monomer(s) polymerize to form a slurry of solid particulate polymer suspended in the polymerisation medium or diluent. Typically, in the particle-form or slurry polymerisation processes for polyethylene, the composition of the slurry in the reactor is: particulate polymer about 15-50 particle vol %, preferably 25-40 particle vol %; suspension fluid of about 30-85 vol %, and monomer of about 1-15 vol %, where the principal diluent is an inert diluent, though these proportions can vary considerably. Particle volume % (vol %) is defined as the volume of particles (excluding interstices volume) in the mixture, divided by the total volume of the mixture.

The invention is most preferably related to polymerisation in an elongated tubular closed loop reaction zone or the so-called 'slurry loop' reactor. In the slurry loop process, the reactor is a tubular loop of e.g. steel pipe located within a larger pipe through which water flows to heat or cool the reactor as desired. One or more circulating pumps drive the reactor contents around the loop at relatively high velocity, in order to promote good heat transfer, maintain the solids in suspension, and to minimize reactor fouling. The loops may be oriented horizontally or vertically. Product take-off from a loop reactor may be continuous, or via periodically opened settling legs. In both cases, solvent slurry medium is removed along with the product, and must be condensed and/or repressurised and reintroduced into the reactor.

In a typical polymerisation process to which the present invention is particularly applicable, the homopolymerization and copolymerisation processes are carried out in the liquid phase in an inert diluent, and the reactants comprise ethylene and hydrogen in the case of homopolymerization, and in the case of copolymerisation they comprise ethylene, alpha-olefinic comonomer(s) comprising from 3 to 8 carbon atoms and optionally hydrogen. The comonomer may be selected from propylene, 1-butene, 1-pentene, 1-hexene, 4-methyl 1-pentene, 1-heptene and 1-octene. The inert diluent may comprise (iso)butane, pentane or hexane. The homopolymerization and copolymerisation processes are typically carried out at a temperature of from 50 to 120° C., at an absolute pressure of 1 to 100 bar.

Such a process can be used to make multi-modal polymers, either in a single reactor or in multiple reactors connected in series or in parallel, in which case any reactor may be preceded or followed by a reactor that is of the same or different type of reactor (e.g. gas phase, stirred slurry tank or loop reactor or solution reactor). In the case of series reactors, a first reactor of the series is supplied with a catalyst, and optionally a cocatalyst, and each subsequent reactor is supplied with, at least, ethylene and with the slurry arising from the preceding reactor of the series, this mixture comprising a catalyst, optionally a cocatalyst and a mixture of the polymers produced in the preceding reactors of the series. It is possible to supply to a second reactor and/or, if appropriate, at least one of the following reactors fresh catalyst and/or cocatalyst, although typically the catalyst and the cocatalyst are introduced exclusively into the first reactor.

The process of the present invention is especially suitable for a polymerisation which comprises the use of at least two slurry reactors in series to produce a polyolefin product where a subsequent slurry reactor employs little or no hydrogen feed compared to the hydrogen feed to a prior slurry reactor. In this case the process of the invention is utilised to remove hydrogen from the intermediate polymer slurry between the cascaded reactors. Usually two slurry reactors are employed, although it is also possible to employ three or more reactors in series. It is also possible to employ two or more slurry reactors in series along with one or more slurry reactors operating concurrently in parallel. In this preferred operation of the present invention, a fractionator is employed to remove hydrogen and also separate other components of the stream.

In a preferred embodiment of the invention, the polymer stream withdrawn from the polymerisation reactor is treated prior to fractionation so as to either minimise the quantity of diluent to be treated and/or to control the average particle size and particle size distribution of the catalytically active material in the diluent stream. The polymer stream is preferably concentrated to achieve solids concentrations of 50-70 wt %.

Preferably the treatment comprises feeding the polymer stream to a hydrocyclone separator prior to fractionation, most preferably with a fresh diluent feed upstream of the hydrocyclone separator, for example as described in our patent number EP 1118624A. Alternatively a sufficiently high solids concentration may be achieved by the use of settling legs in the reactor.

For the purposes of the present invention, the term "hydrocyclone separator" is intended to denote any apparatus which, under the action of a centrifugal force, makes it possible to separate from a suspension of solid particles, on the one hand a liquid flow depleted in solid particles, and on the other hand a flow concentrated in solid particles. Such items of apparatus are well known and are described in particular in Perry's Chemical Engineers' Handbook, McGraw-Hill 7th Edition, 1997, pages 19-24 to 19-28.

If the solids loading of the polymer stream is maintained at a sufficiently high concentration (through appropriate operation of the reactor and/or above-mentioned solids concentration system), the heat content of the polymer stream may be sufficient to provide all the heat necessary for fractionation. In such a case, the stream can be fed directly from the reactor or concentrator into the fractionator for separation without the addition of any further heat. However if the heat content of the solids entering the fractionator is insufficient to provide all of the necessary reboil for the fractionation column, the base of the fractionator may be heated, using either a jacket or a heat exchanger. Preferably, the heat content of the polymer stream is sufficient to provide at least 60%, more preferably at least 70%, of the heat necessary for fractionation.

In an alternative embodiment, the polymer stream withdrawn from the reactor is heated, optionally after concentration and/or depressurization, in the withdrawal line. The resultant stream of solid, gas and optionally liquid is then fed directly to a fractionation column feed vessel or alternatively directly to the fractionation column.

If a fractionator feed vessel is used, it is preferred in one embodiment that the pressure therein is adjusted so as to flash off sufficient diluent from the feed vessel and leave an unsuspended polymer in the base. The flashed diluent stream is then fed to the fractionator vessel, the base of which may be heated if necessary. Other than the use of the slurry line heaters and the column base or feed vessel heating jacket, it is preferred that no external energy is added as reboil for the fractionator column.

Where a suspension is maintained in the fractionator feed vessel the pressure is dictated by the need to minimize the concentration of undesired components in the liquid phase whilst also being able to condense the principal diluent without compression using only cooling medium, preferably water, at a temperature between 15 and 60° C. The flash may be assisted by heating in the feed vessel if necessary.

The flashed diluent stream may be fed directly to the lower part of the fractionation column, preferably the base. In this case the column is designed to handle a large particle size and flow-rate below the feed point and to accommodate fines in the separation stages immediately above the feed point. In this case, the fractionation column preferably has at least 4 actual equilibrium stages, and it is preferred that at least two separation stages above the feed location of the polymer stream are designed to handle solids. The stripping liquid mass flow in this part of the fractionation column, preferably throughout the fractionator, is preferably at least 10 wt % of the vapour mass flow rate. The fractionator may have internal components such as distillation trays (sieve, dual-flow, bubble cap, doughnuts) or may equally be packed, preferably with larger opening packings. The portion of the fractionation column below the feed point is particularly designed to accommodate a high solids concentration and to avoid solids buildup. The base of the column is designed to ensure a high slurry velocity to avoid sedimentation and minimize residence time. The residence time of any solids in the column is preferably maintained at less than 30 seconds, preferably no more than 90 seconds.

In the fractionation column, liquid bottoms product, containing polymer, diluent and heavier hydrocarbons and/or comonomers, is withdrawn from the base of the column. This may optionally be recycled to the fractionator feed vessel. Overhead vapour from the column typically contains hydrogen and monomer. Sidedraw streams may also be taken off, containing varying compositions of diluent and monomer. These may be recycled to the reactor.

The fractionation column base temperature should always be maintained at least 5° C. below the sintering temperature or solubility temperature of the polymer produced in an upstream reactor. The design and reliable operation of the separation process is optimised through careful equipment design and selection and control of the fluid flowrates and temperature and pressure conditions through the fractionation column to ensure that the solids do not collect at any point in the fractionator and that fouling of the internals is avoided or at least minimized to such an extent that any required cleaning operations do not in themselves reduce plant availability. Typically the fractionator design is optimized with a base temperature of above 50° C. In one preferred embodiment of the invention the profile of the column temperature and concentration of the principal monomer concentration profile is designed to avoid excessive peaks in the catalytic activity in any particular stage of the column.

The fractionation is preferably carried out a pressure lower than that in the preceding reactor but greater than 1 barg, preferably greater than 3.5 barg.

The slurry in the base of the fractionator column, and in certain embodiments in the base of the fractionator feed vessel, is preferably kept in suspension at all times, and is usually agitated with a stirrer; however it may alternatively or additionally be suspended using an external circulation pump.

In the case where unsuspended polymer powder is maintained in the fractionator feed vessel, the base may be designed to enable a constant powder level to be maintained whilst allowing continuous or discontinuous flow out of the vessel. The base is preferably conical in shape with the angle of the cone and the outlet nozzle diameter sized so as to maintain plug or mass flow for the range of powders (taking into account the expected associated hydrocarbon content) that the vessel is designed to handle.

In a preferred embodiment, the fractionator base is discharged to a slurry vessel that receives both slurry feed from the fractionator base and also suspended or unsuspended solids from the fractionator feed vessel base. In this case the solids in the fractionator feed vessel are preferably unsuspended. Fresh diluent may be added to the transfer line between the fractionator feed vessel base and the slurry vessel. In the case where the fractionator is separating a feed stream intermediate two polymerisation reactors in a bimodal polymerisation, the slurry vessel discharges to the second reactor.

A specific example of a process for application of the present invention is a suspension polymerisation process for the production of a bimodal high density polyethylene comprising an ethylene homopolymer (A) and a copolymer of ethylene and 1-hexene (B) formed in two reactors in series. Such a process may be carried out using the apparatus shown in FIG. 2 (see below).

The diluent used in this particular polymerisation process is usually a hydrocarbon-comprising diluent which is inert with respect to the catalyst, the cocatalyst and the polymer formed, such as, for example, a linear or branched alkane or a cycloalkane having from 3 to 8 carbon atoms. The diluent which has given the best results is isobutane. One advantage of the use of isobutane lies in particular in its ready recycling. This is because the use of isobutane makes it possible to recycle the diluent recovered at the end of the process according to the invention in the first reactor without having to carry out exhaustive purification in order to remove the residual hexene. This is because, as the boiling temperatures of isobutane and of hexene are far apart, their separation can be carried out by distillation.

In this preferred process, the amount of ethylene introduced into the first polymerisation reactor and into the subsequent polymerisation reactor is generally adjusted so as to obtain a concentration of ethylene in the diluent of 5 to 50 g of ethylene per kg of diluent. The amount of hydrogen introduced into the first reactor is generally adjusted so as to obtain, in the diluent, a molar ratio of hydrogen to ethylene of 0.05 to 1. A hydrogen/ethylene molar ratio which does not exceed 0.6 is particularly preferred.

The mixture withdrawn from the first reactor, additionally comprising homopolymer (A), is subjected to a reduction in pressure so as to remove (degas) at least a portion of the hydrogen, which can be conducted in accordance with the present invention. The reduction in pressure is advantageously carried out at a temperature of less than or equal to the polymerisation temperature in the first reactor. The temperature at which the reduction in pressure is carried out is usually at least 40° C. The pressure at which the reduction in pressure is carried out is less than the pressure in the first reactor, and is usually between 0.1 and 1.5 MPa. The amount of hydrogen still present in the at least partially degassed slurry (liquid+solid) mixture is generally less than 1% by weight of the amount of hydrogen initially present in the mixture withdrawn from the first polymerisation reactor; this amount is preferably less than 0.5%. The amount of hydrogen present in the partially degassed mixture introduced into the subsequent polymerisation reactor is consequently low, or even zero. The subsequent reactor is preferably also fed with hydrogen. The amount of hydrogen introduced into the subsequent reactor is generally adjusted so as to obtain, in the diluent, a molar ratio of hydrogen to ethylene of 0.001 to 0.1 in the reactor, typically between 0.004 and 0.05. In this process, the ratio of the concentration of hydrogen in the diluent in the first reactor to the concentration in the subsequent polymerisation reactor is usually at least 20, preferably between 40 and 200.

The amount of 1-hexene introduced into the subsequent polymerisation reactor is such that, in this reactor, the hexene/ethylene molar ratio in the diluent is at least 0.05, preferably at least 0.1. The amount of hexene introduced into the subsequent reactor is such that the hexene/ethylene molar ratio is preferred not to exceed 3. The first reactor is usually not fed with hexene; indeed, it is essential that the first reactor is essentially devoid of 1-hexene. Consequently, the diluent introduced into the first reactor, which can be recycled diluent, must be highly depleted in hexene. The diluent introduced into the first reactor preferably contains less than 1000 ppm of hexene, and is ideally essentially free of hexene.

The polymerisation temperature is generally from 20 to 130° C., typically not exceeding 115° C. The total pressure at which the process according to the invention is carried out is generally from 0.1 MPa to 10 MPa. In the first polymerisation reactor, the total pressure is usually at least 2.5 MPa, but not greater than 5 MPa. In the subsequent polymerisation reactor, the total pressure is usually at least 1.3 MPa, but not greater than 4.3 MPa.

In this preferred process, a suspension comprising a composition comprising from 30 to 70% by weight of the homopolymer (A) and from 30 to 70% by weight of the copolymer (B) is collected at the outlet of the subsequent polymerisation reactor. The composition comprising ethylene polymers can be separated from the suspension by any known means. The suspension is usually subjected to a reduction in pressure (final reduction in pressure), so as to remove the diluent, the ethylene, the hexene and, optionally, the hydrogen from the composition.

According to an alternative form of this process and more particularly when the diluent is isobutane, the gases exiting from the first reduction in pressure (intermediate reduction in pressure between the two polymerisation reactors) and from the final reduction in pressure are mixed, and conveyed to a distillation unit. This distillation unit is advantageously composed of one or of two distillation columns in series. Ethylene and hydrogen are withdrawn at the column top, a mixture of isobutane and of hexene is withdrawn at the column bottom and isobutane devoid of hexene is withdrawn from an intermediate plate. The isobutane-hexene mixture is then recycled in the subsequent polymerisation reactor, whereas the isobutane devoid of hexene is recycled in the first reactor.

The catalyst employed in the polymerisation process may be any catalyst(s) suitable for polymerisation reactions, but is typically a chromium catalyst, a Ziegler-Natta catalyst, or a metallocene catalyst. Usually the catalyst is a Ziegler-Natta catalyst.

In the case of a Ziegler-Natta catalyst, the catalyst used comprises at least one transition metal. Transition metal means a metal of groups 4, 5 or 6 of the Periodic Table of elements (CRC Handbook of Chemistry and Physics, 75th edition, 1994-95). The transition metal is preferably titanium and/or zirconium. A catalyst comprising not only the transition metal but also magnesium is preferably utilised. Good results have been obtained with catalysts comprising:

from 10 to 30%, preferably from 15 to 20%, more preferably 16 to 18% by weight of transition metal,
from 0.5 to 20%, preferably from 1 to 10%, more preferably 4 to 5% by weight of magnesium,
from 20 to 60%, preferably from 30 to 50%, more preferably 40 to 45% by weight of halogen, such as chlorine,
from 0.1 to 10%, preferably from 0.5 to 5%, more preferably 2 to 3% by weight of aluminum;
the balance generally consisting of elements arising from products used for their manufacture, such as carbon, hydrogen and oxygen. These catalysts are preferably obtained by coprecipitation of at least one transition metal composition and a magnesium composition by means of a halogenated organoaluminum composition. Such catalysts are known, they have notably been described in patents U.S. Pat. No. 3,901,863, U.S. Pat. No. 4,292,220 and U.S. Pat. No. 4,617,360. The catalyst is preferably introduced only into the first polymerisation reactor, i.e. there is no introduction of fresh catalyst into the further polymerisation reactor.

The cocatalyst utilised in the process is preferably an organoaluminum compound. Unhalogenated organoaluminium compounds of formula $AlR_3$ in which R represents an alkyl grouping having from 1 to 8 carbon atoms are preferred. Particularly preferred are triethylaluminium and triisobutylaluminum. The cocatalyst is introduced into the first polymerisation reactor. Fresh cocatalyst may also be introduced into the filter reactor. The quantity of cocatalyst introduced into the first reactor is in general at least $0.1 \times 10^{-3}$ mole per litre of diluent. It does not usually exceed $5 \times 10^{-3}$ mole per litre of diluent. Any quantity of fresh cocatalyst introduced into the further reactor does not usually exceed $5 \times 10^{-3}$ mole per litre of diluent.

BRIEF DESCRIPTION OF THE DRAWINGS

Specific embodiments of the present invention will now be described with reference to the accompanying drawings, in which.

DETAILED DESCRIPTION OF PREFERRED EMBODIMENTS

Figure 1:
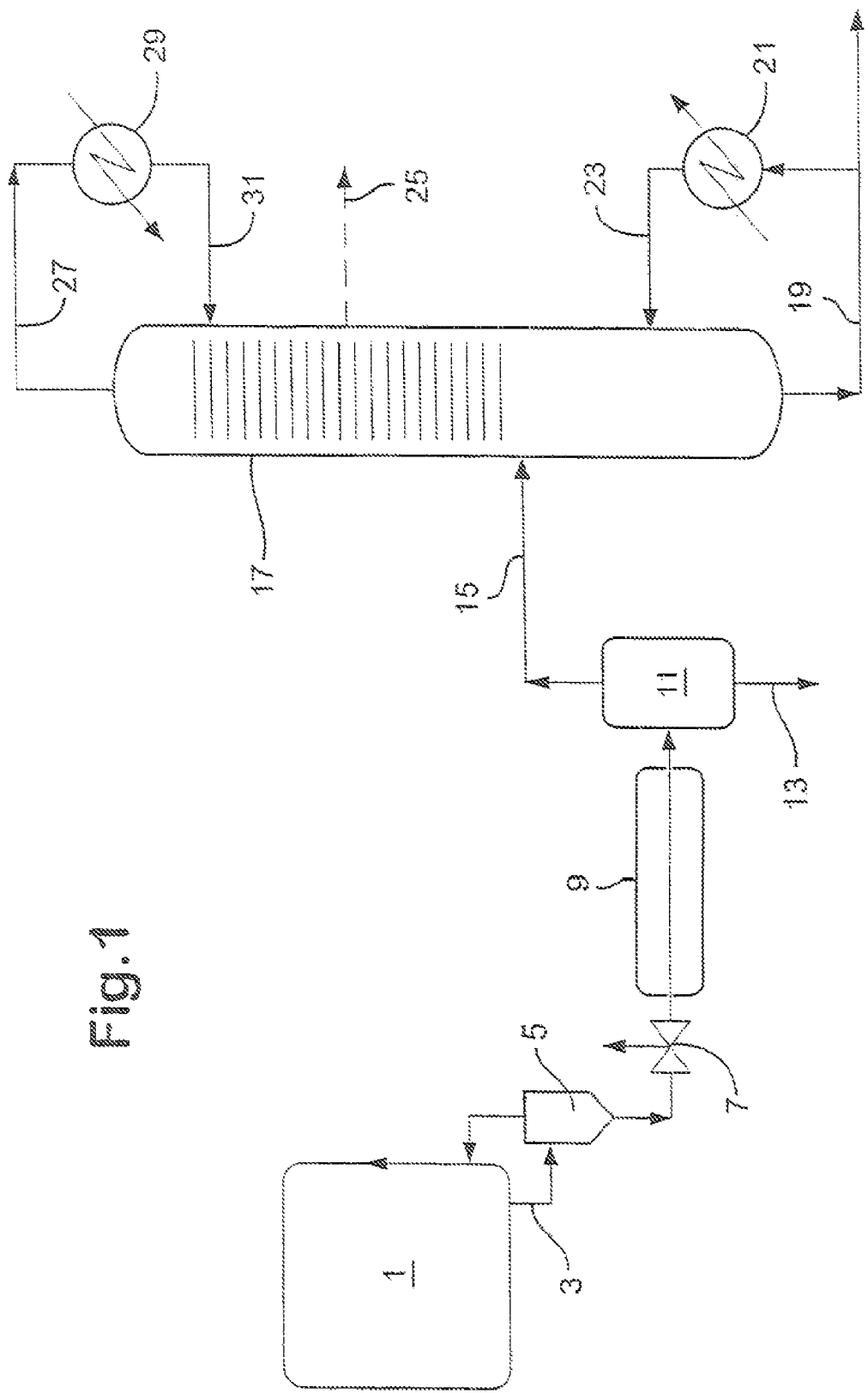
FIG. 1 shows a flowsheet for a polymerisation system comprising a single slurry loop polymerisation reactor with associated fractionator.

Referring to FIG. 1, a diluent is maintained in a liquid phase during a polymerisation reaction where the polymer solids produced are essentially not soluble in the diluent and are suspended by it. The effluent stream of the polymerisation reactor 1 comprises a liquid diluent carrying a slurry of polymer solids together with residual catalyst and reagents such as monomer(s), comonomer(s), molecular weight control agents such as hydrogen, and cocatalysts.

The effluent stream is withdrawn from the reactor via line 3 from where it passes into a hydrocyclone 5 which concentrates the slurry to a solids level of about 50-70 wt %. The stream is then usually subjected to a pressure let-down at 7, from the reactor pressure (typically 40 barg) to a pressure of 7-10 barg. Depending on the solids concentration and temperature of the stream, the heat content of the stream may be boosted by slurry line heater 9; the degree of heat input designed or controlled to maximise vaporization of liquid whilst avoiding risk of sintering in the heater. Preferably the slurry heater exit temperature is controlled to the dew point temperature of the stream of fluid withdrawn.

The stream then passes into a fractionator feed vessel 11. The pressure in the feed vessel 11 is adjusted so as to flash off sufficient diluent to leave an unsuspended polymer in the base. The solid polymer is withdrawn through line 13.

The flashed diluent stream is then fed via line 15 towards the fractionator column 17, preferably at the base. The base of the column may be heated if the solids content of the stream is insufficient to provide enough heat for fractionation. The pressure at which column 17 operates can be in the broad range of 1 barg to 30 barg or more. Preferred temperature conditions in column 17 include an overhead temperature (temperature at the top of the column) of 30-50° C. and a bottoms temperature (temperature at the bottom of the column) of 65-95° C. The fractionator has between 5 and 25 sieve and/or dual flow trays.

Liquid bottoms product, typically containing diluent rich in heavy comonomer(s), is withdrawn from column 17 through line 19. If additional heating is required, some of the bottoms product is passed through line 19 to a heater (reboiler) 21, and from there through line 23 as vapour back to column 17. Alternately, the bottom of Column 17 can be heated with a jacket.

In the case where the comonomer is heavier than the diluent, a (preferably vaporous) sidedraw stream may optionally be withdrawn from column 17 through line 25. The sidedraw stream typically contains mainly diluent lean in comonomer. The sidedraw stream is cooled and condensed and then recycled to the reactor 1 (not shown). It can also be withdrawn from the column as a liquid. The column, by providing a stream leaner in comonomer than in the preceding reactor, and or by providing buffer capacity of comonomer lean streams provides the facility to substantially reduce the time for product transitions between polymer grades of differing density.

Overhead vapour from column 17, typically containing diluent, unreacted monomer, hydrogen, nitrogen, and other lights passes through line 27 to cooler 29, where it is condensed to be recycled as reflux to the column 17 via line 31. A lights vent may be taken from the condenser.

Figure 2:
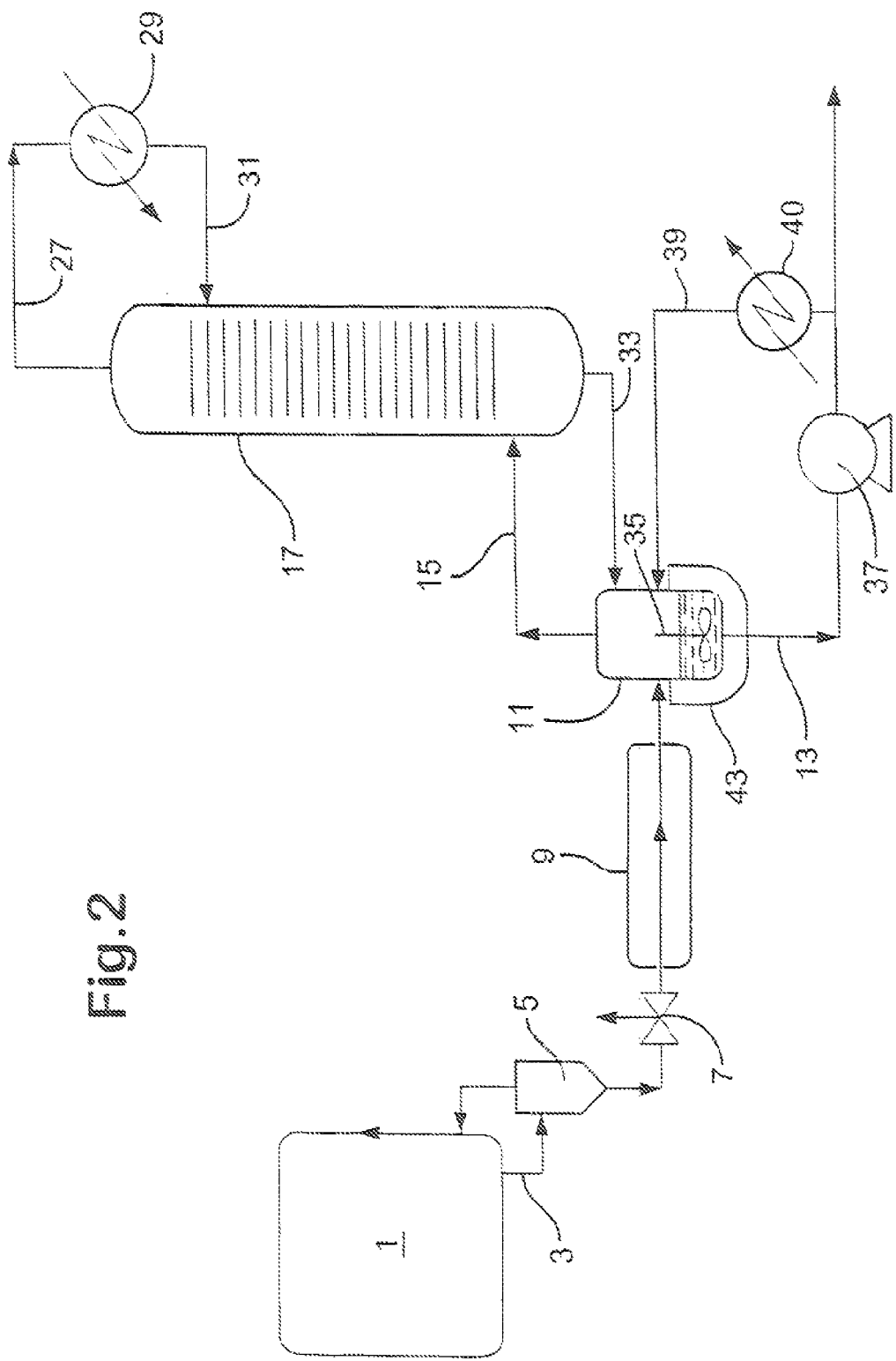
FIG. 2 shows an alternative embodiment relating to a bimodal polymerisation in which hydrogen is removed from the polymerisation stream by a fractionator located between the reactors.

Referring to FIG. 2, this shows an alternative embodiment of the invention relating to a bimodal polymerisation in which hydrogen is removed from the polymerisation stream by a fractionator located between the reactors. The second reactor is not shown in the Figure. In the arrangement shown in FIG. 2, the numerals are the same as in FIG. 1. The principal difference from the arrangement of FIG. 1 is that in this embodiment the bottoms product from the fractionator 17 is recycled to the fractionator feed vessel 11 via line, 33. In this case the polymer in the bottom of the feed vessel 11 is maintained in suspension in the diluent by a stirrer 35, and this suspension is withdrawn from the base of the feed vessel via line 13 and pumped by pump 37 to the second-reactor (not shown). The liquid portion of the stream withdrawn through line 13 may be recycled to the feed vessel 11 via line 39, which may contain a heater 40. The feed vessel 11, having a well agitated solids suspension, may be heated by a heater 43.

Regarding the fractionator 17 in the embodiment of FIG. 2, this operates as in FIG. 1 without any sidedraws except that hydrogen is vented from the overhead stream, line 27, when the stream is otherwise condensed in the cooler 29. Thus the recycled stream 31 has a substantially reduced level of hydrogen. Stream 33 recovers the vast majority of diluent, comonomers and even monomer flashed in vessel 11 whilst being lean in hydrogen. This fractionator design typically has about 5 sieve and/or dual flow trays.

Figure 3:
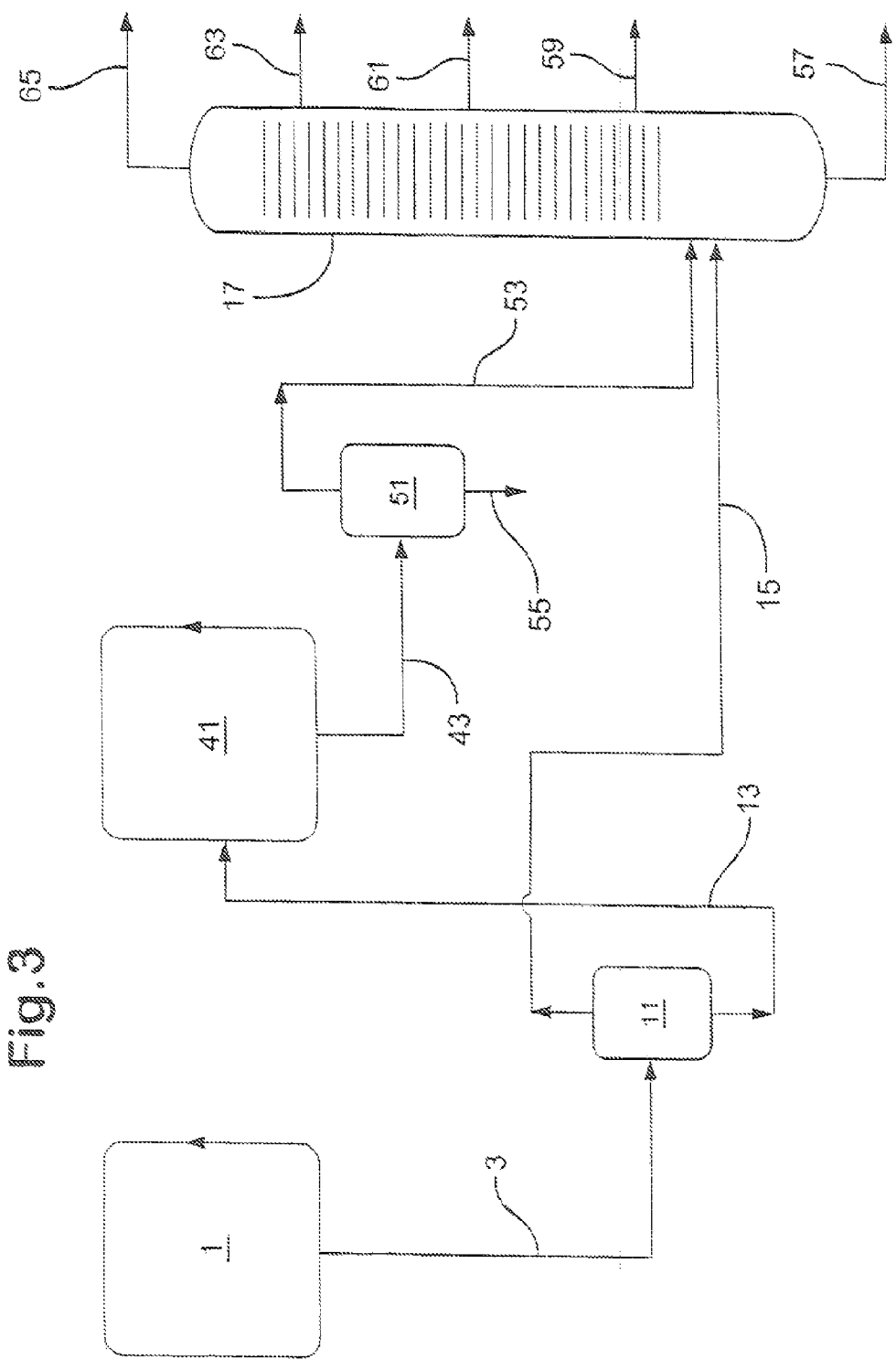
FIG. 3 shows a further embodiment of the invention relating to a bimodal polymerisation in two reactors.

Referring to FIG. 3, this shows a further embodiment of the invention relating to a bimodal polymerisation in two reactors, in which a single fractionation column is used to treat both the polymer stream intermediate the reactors and also the final stream from the second reactor. In the following description it is assumed that the low molecular weight product is made in the first reactor, however this design configuration gives full flexibility, by choosing the appropriate recycle streams from the fractionator, to equally enable the high molecular weight product to be made in the first reactor.

As in the embodiments of FIGS. 1 and 2, effluent stream from the first reactor 1 is withdrawn from the reactor via line 3 from where it passes into a fractionator feed vessel 11 (details shown in FIGS. 1 and 2 omitted here). As in the previous embodiments, concentration with a hydrocyclone, a pressure let-down and additional heating (none shown in the Figure) may all be applied to the stream if required.

Diluent is flashed from the feed vessel 11 via line 15 to a fractionation column 17. All or most of comonomer rich diluent stream from column 17 is returned to vessel 11 via line 57. Suspended polymer is withdrawn from the bottom of the feed vessel 11 via line 13 and is transferred to the second reactor 41, where additional comonomer may be added as desired.

Effluent stream from the second reactor 41 is withdrawn from the reactor via line 43 from where it passes into a second fractionator feed vessel 51. As in the case of the first reactor 1, concentration with a hydrocyclone, a pressure let-down and additional heating (none shown in the Figure) may all be applied to this second effluent stream if required. A powder level is maintained in second fractionator feed vessel 51 and the unsuspended, final polymer product essentially absent of free liquid, is withdrawn via line 55, whilst the vapourised diluent stream is then fed via line 53 to the fractionation column 17.

The temperature profile and pressure of column 17 is adapted so as to remove separate the full spectrum of components of the incoming stream. Preferred temperature conditions in column 17 include an overhead temperature (temperature at the top of the column) of 35-55° C. and a bottoms temperature (temperature at the bottom of the column) of 65-95° C. Liquid bottoms product, together with any polymer fines, typically containing diluent and rich in comonomer, is withdrawn from column 17 through, line 57. Optional sidedraw stream 59 consists mainly of diluent and some comonomer. Optional sidedraw stream 61 takes off diluent free of monomer if required for example for transport of catalyst to reactor 1. Sidedraw stream 63 consists of a diluent stream free of comonomer that may be recycled to reactor 1. Overhead vapour, from column 17 withdrawn in line 27 and a stream rich in hydrogen, together with some monomer is vented from condenser 29 through line 65. The number of trays required in the column is minimised by preferably not designing it to separate monomer from the diluent streams recycled to either reactor.

Figure 4:
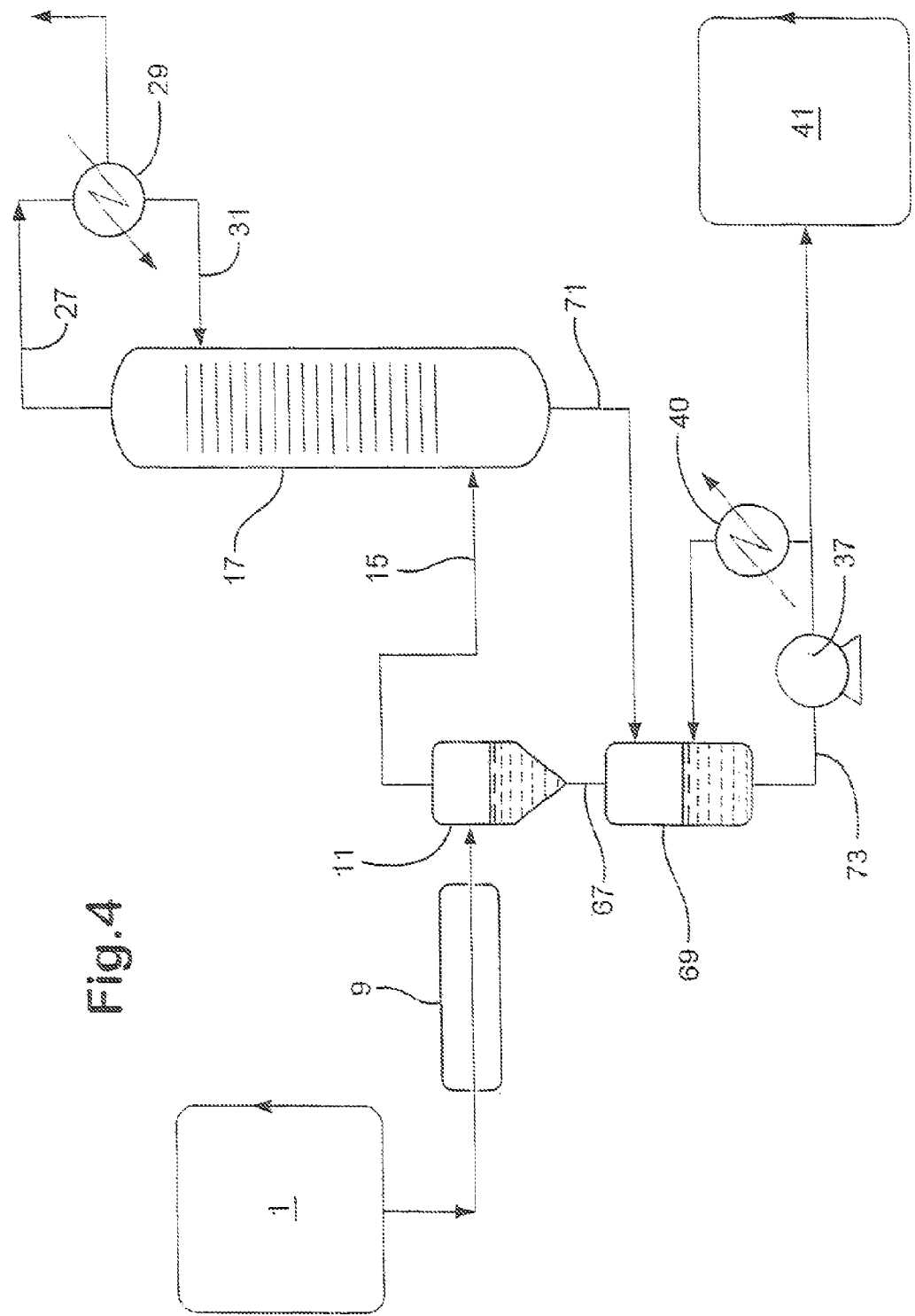
FIG. 4 shows an embodiment relating to a bimodal polymerisation in which hydrogen is removed from the polymerisation stream by a fractionator located between the reactors.

Referring to FIG. 4, this shows an embodiment of the invention relating to a bimodal polymerisation in which hydrogen is removed from the polymerisation stream by a fractionator located between the reactors. Thus this is similar to the embodiment of FIG. 2, and where appropriate reference numerals are the same. The effluent stream passes from reactor 1 to fractionator feed vessel 11 in the same manner as in the embodiment of FIG. 2. The pressure in the feed vessel 11 is adjusted so as to flash off sufficient diluent to the fractionator 17 via line 15 to leave an unsuspended polymer in the base. Line 15 enters the fractionator 17 above the bottom so as to enhance hydrogen separation. The solid polymer is withdrawn through line 67 into a second slurry vessel 69, which also receives the bottoms product from the fractionator 17 via line 71. A reboiler can also be present at the bottom of column 17 to enhance separation in the column. The polymer in the bottom of the slurry vessel 69 is in suspension in the hydrogen lean diluent, and this suspension is withdrawn from the base of the slurry vessel 69 via line 73 and pumped by pump 37 to the second reactor 41. A liquid portion of the stream withdrawn through line 73 may be recycled to the slurry vessel 69 via line 39.

Example

In one specific example of the invention in which a fractionator is employed between two reactors in a bimodal dual-reactor system such as described in FIG. 2, the fractionator is fed with a stream comprising isobutane, ethylene, hydrogen, hexene-1 and polyethylene issuing from a first polymerisation reactor. This stream is first concentrated in a hydrocyclone, after which it is passed through a slurry heater before entering the base of the fractionator.

In this particular example, a flow rate of 10090 kg/h of polyethylene and 9685 kg/h hydrocarbon enters the base of the fractionator. The hydrocarbon in this case comprises mainly isobutane but also contains about 3.22 kg/h of hydrogen, 116 kg/h ethylene, about 10 kg/h of solid polymer which contains some active catalyst, and minor amounts of other components.

As the stream enters the base of the fractionator, the hydrocarbon portion is about 75% vapour. Upon entering the base, the residual liquid and almost all of the solid polyethylene falls into a boiling and agitated pool. The base slurry in this example is heated by a jacket which provides the heat for about a third of the column's vapour flow, and is at about 70° C. and 10 barg pressure.

The hydrocarbon vapour coming from the reactor stream combines with the boil-up from the boiling slurry in the fractionator base such that a vapour flow of about 11500 kg/hr enters the fractionation column. This vapour contains some catalytically active polymer fines which carry over from the upstream equipment. The fractionation column is about 1 metre in diameter, and has five dual-flow trays. Each tray has about 9% open area, and has holes of 25 mm diameter. This large hole diameter is important to ensure that blocking is minimised.

The gas stream works its way up the scrubber, and each tray progressively removes fines by contacting the gas/fines stream with a liquid stream which is falling down the column. This also removes hydrogen from the liquid which falls down the column.

At the top of the column, the stream enters a condenser and is almost totally condensed at about 30° C. A gas purge is taken off this condensed stream to remove hydrogen. A filter may be installed in this stream to test the solids removal efficiency of the column: the Applicants have never found any trace of polyethylene in such a filter. Additionally, the Applicants have never found any polyethylene in the condenser, nor have they experienced any sort of fouling. These observations confirm the excellent performance of the system in handling active fines.

The liquid which is condensed is returned to the fractionator and falls back down each tray. By the time it reaches the bottom of the fractionator the liquid has been depleted of hydrogen, and any active fines are recycled back to the base liquid. It should be noted that since almost all the liquid is condensed and returned back to the fractionator base, there is no need for liquid make-up in the base to maintain solids concentration. The essentially hydrogen-free slurry is agitated to minimise settling, and is then pumped to the second reactor. A slip stream is taken off this pump discharge and returned to the slurry base to aid in slurry homogeneity. The typical hydrogen content of the slurry going to the second reactor is below 100 g/h. Thus, considering the initial hydrogen flow rate leaving the first reactor of 3.22 kg/h, it can be seen that the process of the invention is very efficient at removing hydrogen from the feed stream and also removing active fines from the purge gas at the top of the column. This simple equipment thereby demonstrates a reliable and economic means to control hydrogen concentration and hence molecular weight in the second reactor independently of conditions required in the first reactor—even when using diluents which are vapour under atmospheric conditions. Furthermore, the column may also be adjusted so as to minimise the amount of ethylene and diluent lost.

The invention claimed is:

1. Process for the polymerisation of olefins comprising withdrawing at least part of a catalytically active stream from a polymerisation reactor and passing said withdrawn stream through a fractionator.

2. Process according to claim 1, which is a continuous process, in which the catalytically active stream is continuously withdrawn.

3. Process according to claim 1, wherein the catalytically active stream leaving the polymerisation reactor contains at least 10 vol % solid polymer.

4. Process according to claim 1, wherein the polymer fed into the fractionator is solid and has a particle size such that at least 50% of the polymer has a particle size of at least 7 μm.

5. Process according to claim 4, wherein at least 50% of the solid polymer has a particle size less than 100 μm.

6. Process according to claim 1, wherein polymer in the stream fed into the fractionator is present in a concentration of at least 0.002 vol %.

7. Process according to claim 4, wherein at least 50% of the solid polymer has a particle size less than 2000 μm.

8. Process according to claim 1, wherein the heat content of the stream entering the fractionator is sufficient to provide at least 60% of the heat necessary for fractionation.

9. Process according to claim 1, wherein the stream withdrawn from the polymerisation reactor is fractionated at a pressure such that the principal diluent of the stream is substantially condensed without compression using only cooling medium, at a temperature between 15 and 60° C.

10. Process according to claim 1, wherein the stream withdrawn from the polymerisation reactor is fractionated at a pressure such that the principal diluent of the stream is substantially condensed without compression using only cooling medium at a temperature between 15 and 60° C., and there is no reduction in pressure to below fractionation pressure applied to the stream between the reactor and the fractionator.

11. Process according to claim 1, wherein the fractionator comprises equilibrium stages which comprise sieve trays and/or dual flow trays.

12. Process according to claim 1, wherein the fractionator comprises equilibrium stages and wherein at least the first two equilibrium stages in the fractionator are located above the feed location of the stream and have a stripping liquid flow that is at least 10 wt % of the vapour flow rate.

13. Process according to claim 1, wherein the fractionator comprises equilibrium stages, and wherein every equilibrium stage in the fractionator has a stripping liquid flow that is at least 10 wt % of its vapour flow rate.

14. Process according to claim 1, wherein the residence time of any solids in the fractionator is maintained at no more than 90 seconds.

15. Process according to claim 1, which is a process for the polymerisation of ethylene or propylene utilizing more than one reactor in series, and wherein the principal diluent is an inert diluent or monomer.

16. Process according to claim 1, which is a process for the polymerisation of ethylene or propylene utilising more than one reactor in series, and wherein the principal diluent is an inert diluent or monomer, and hydrogen and/or comonomer is employed in at least one of the polymerisation reactors, and fractionation removes at least some of the hydrogen and/or comonomer from at least one of the streams containing the principal diluent prior to its distribution to a downstream reactor.

17. Process according to claim 1, which is a process for the polymerisation of ethylene utilising more than one reactor in series to form a polymer comprising at least 30 wt % of a low molecular weight component having a density of at least 0.965 g/cm$^3$ and an MI$_2$ of from 5 to 1000 g/10 min, and at least 30 wt % of a high molecular weight component having a density of from 0.910 to 0.940 g/cm$^3$ and an MI$_5$ of from 0.01 to 2 g/10 min, wherein the principal diluent is an inert diluent or monomer, and hydrogen and/or comonomer is employed in at least one of the polymerisation reactors, and fractionation removes at least some of the hydrogen and/or comonomer from at least one of the streams containing the principal diluent prior to its distribution to a downstream reactor.

18. Process according to claim 6, wherein the concentration of polymer in the stream fed into the fractionator is at least 30 vol %.

19. Process according to claim 18, wherein the concentration of polymer in the stream fed into the fractionator is at least 40 vol %.

20. Process according to claim 10, wherein the cooling medium is water.

* * * * *